US010129128B2

(12) United States Patent
Burbridge et al.

(10) Patent No.: US 10,129,128 B2
(45) Date of Patent: Nov. 13, 2018

(54) ANALYSIS OF NETWORK PERFORMANCE

(71) Applicant: BRITISH TELECOMMUNICATIONS PUBLIC LIMITED COMPANY, London (GB)

(72) Inventors: Trevor Burbridge, London (GB); Philip Eardley, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 15/761,119

(22) PCT Filed: Sep. 26, 2016

(86) PCT No.: PCT/EP2016/072881
§ 371 (c)(1),
(2) Date: Mar. 19, 2018

(87) PCT Pub. No.: WO2017/055225
PCT Pub. Date: Apr. 6, 2017

(65) Prior Publication Data
US 2018/0270135 A1 Sep. 20, 2018

(30) Foreign Application Priority Data
Sep. 30, 2015 (EP) .................................. 15187797

(51) Int. Cl.
*G06F 15/16* (2006.01)
*H04L 12/26* (2006.01)
(Continued)

(52) U.S. Cl.
CPC .............. *H04L 43/10* (2013.01); *H04L 43/04* (2013.01); *H04L 43/08* (2013.01);
(Continued)

(58) Field of Classification Search
CPC ................................. H04L 43/12; H04L 43/08
See application file for complete search history.

(56) References Cited

U.S. PATENT DOCUMENTS 7,356,578 B1 * 4/2008 Eatough .................. H04L 43/00 709/223
7,885,203 B2 2/2011 Costanza et al.
(Continued)

FOREIGN PATENT DOCUMENTS

CN 1581810 2/2005
CN 101304345 11/2008
(Continued)

OTHER PUBLICATIONS

Chinese Search Report dated Jun. 26, 2018, issued in corresponding Chinese Application No. 201680043678.5 (2 pages) and English translation (2 pages).
(Continued)

*Primary Examiner* — Hieu T Hoang
(74) *Attorney, Agent, or Firm* — Nixon & Vanderhye PC

(57) ABSTRACT

Methods and apparatus are disclosed for analyzing network performance in relation to a network portion comprising a group of nodes. The method may comprise: obtaining probe measurements in respect of a plurality of target nodes in the group, respective probe measurements each resulting from a probe test-message being sent via a network path from a testing node to a target node and an associated probe response-message triggered by receipt and local processing at the respective target node of the probe test-message being received via a path from the respective target node by the testing node, the respective probe measurements relating to a network performance characteristic in respect of the paths taken by the respective probe test-messages and the probe response-messages associated therewith and being dependent also on the local processing of the respective probe
(Continued)

Comparing Different Nodes in Same Group to Identify More Reliable Node test-messages at the respective target nodes; comparing probe measurements obtained in respect of different target nodes in the group, and in dependence on the comparison, assigning a weighting in respect of at least one of the nodes; and determining a network performance analysis measure in relation to the network portion according to a predetermined function dependent on the probe measurements and on the weighting.

17 Claims, 9 Drawing Sheets

(51) Int. Cl.
    *H04L 12/801*     (2013.01)
    *H04L 12/841*     (2013.01)

(52) U.S. Cl.
    CPC ...... *H04L 43/0817* (2013.01); *H04L 43/0852* (2013.01); *H04L 43/12* (2013.01); *H04L 43/50* (2013.01); *H04L 47/115* (2013.01); *H04L 47/283* (2013.01)

(56) References Cited

U.S. PATENT DOCUMENTS

| | | | |
|---|---|---|---|
| 8,510,469 B2 | 8/2013 | Portolani | |
| 9,043,453 B1* | 5/2015 | Kielhofner | H04L 29/08072 709/223 |
| 2004/0220984 A1* | 11/2004 | Dudfield | H04L 41/0893 708/200 |
| 2005/0025062 A1 | 2/2005 | Costanza et al. | |
| 2005/0060429 A1* | 3/2005 | Massoulie | H04L 41/0816 709/243 |
| 2005/0122983 A1 | 6/2005 | Gilmartin et al. | |
| 2006/0187820 A1* | 8/2006 | French | H04L 29/12066 370/227 |
| 2009/0122697 A1* | 5/2009 | Madhyasha | H04L 41/12 370/229 |
| 2010/0315958 A1 | 12/2010 | Luo et al. | |
| 2011/0055470 A1 | 3/2011 | Portolani | |
| 2011/0082928 A1* | 4/2011 | Hasha | H04L 67/1095 709/224 |
| 2012/0023230 A1* | 1/2012 | Hosking | H04L 41/12 709/224 |
| 2014/0032628 A1 | 1/2014 | Cudak et al. | |
| 2014/0269303 A1 | 9/2014 | Toy | |
| 2015/0333997 A1* | 11/2015 | Mermoud | H04L 43/12 370/252 |
| 2016/0142266 A1* | 5/2016 | Carroll | H04L 41/16 706/12 |

FOREIGN PATENT DOCUMENTS

| | | |
|---|---|---|
| CN | 102484653 | 5/2012 |
| EP | 1 206 085 | 5/2002 |
| JP | 2012-186667 | 9/2012 |

OTHER PUBLICATIONS

Chinese Office Action dated Jul. 5, 2018, issued in corresponding Chinese Application No. 201680043678.5 (3 pages) and English translation (3 pages).
International Search Report for PCT/EP2016/072881, dated Nov. 23, 2016, (5 pages).
Written Opinion of the ISA for PCT/EP2016/072881, dated Nov. 23, 2016, (5 pages).
Combined Search and Examination Report for GB1517320.6, dated May 31, 2016, (5 pages).
Extended Search Report for EP15187797, dated Apr. 1, 2016, (9 pages).
Almes et al., "A Round-trip Delay Metric for IPPM", Network Working Group, vol. ippm, Nov. 1, 1998, XP015020649, whole document (19 pages).
Cisco Systems et al, "Understanding the Ping and Traceroute Commands", Jan. 1, 2010, XP055052448, (pp. 1-22).
Luckie et al: "Challenges in Inferring Internet Interdomain Congestion", Proceedings of the 2014 Conference on Internet Measurement Conference, IMC '14, Jan. 1, 2014, XP055254633, (7 pages).
Clark et al: "Measurement and Analysis of Internet Interconnection and Congestion", Telecommunications Policy Research Conference (TPRC), Sep. 2014 (16 pages).

* cited by examiner

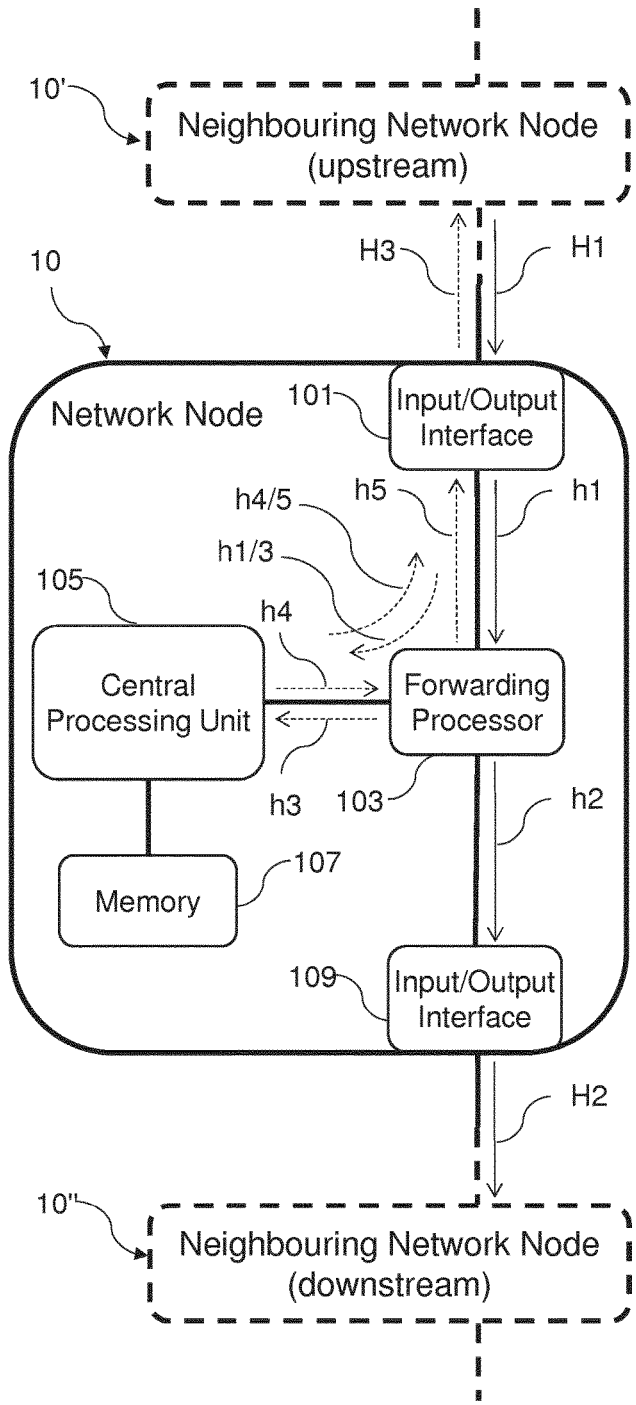
Figure 1: A Network Node and Two Neighbouring Nodes

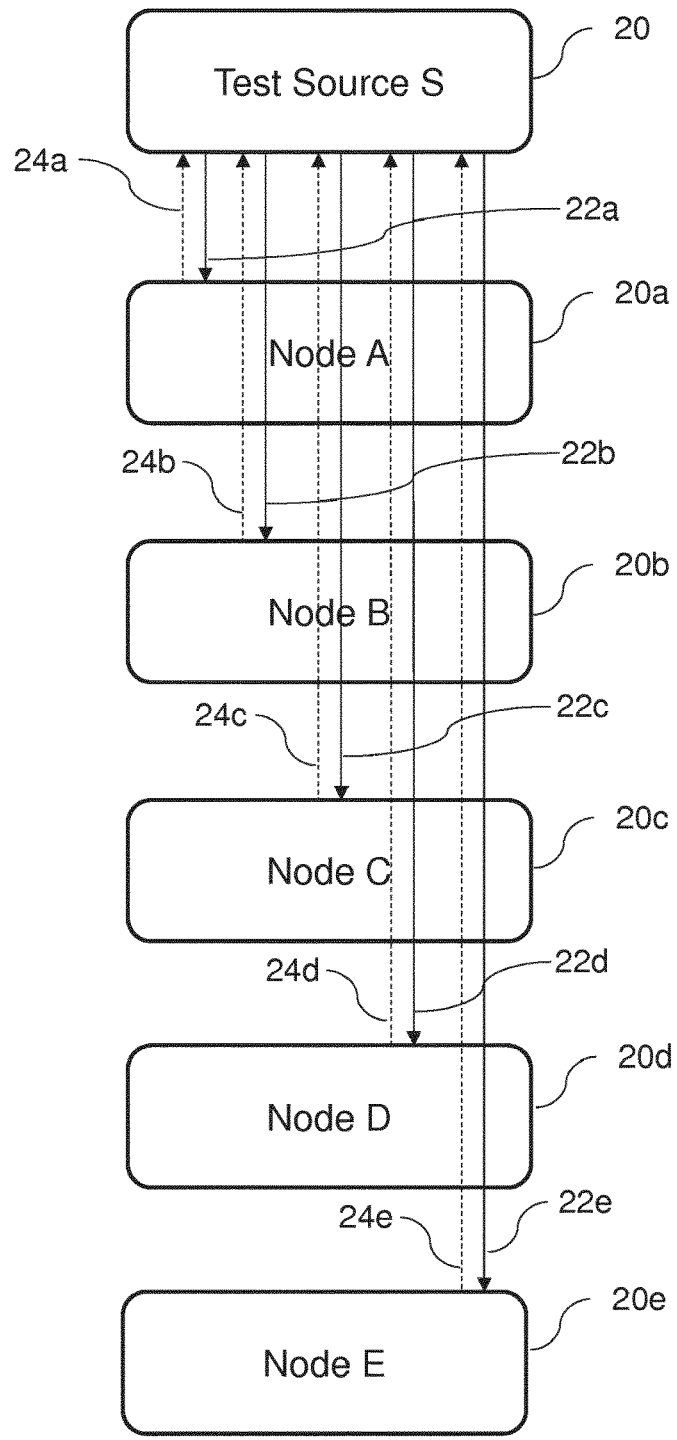
Figure 2 - Probes can be sent to/from each Node along a network path

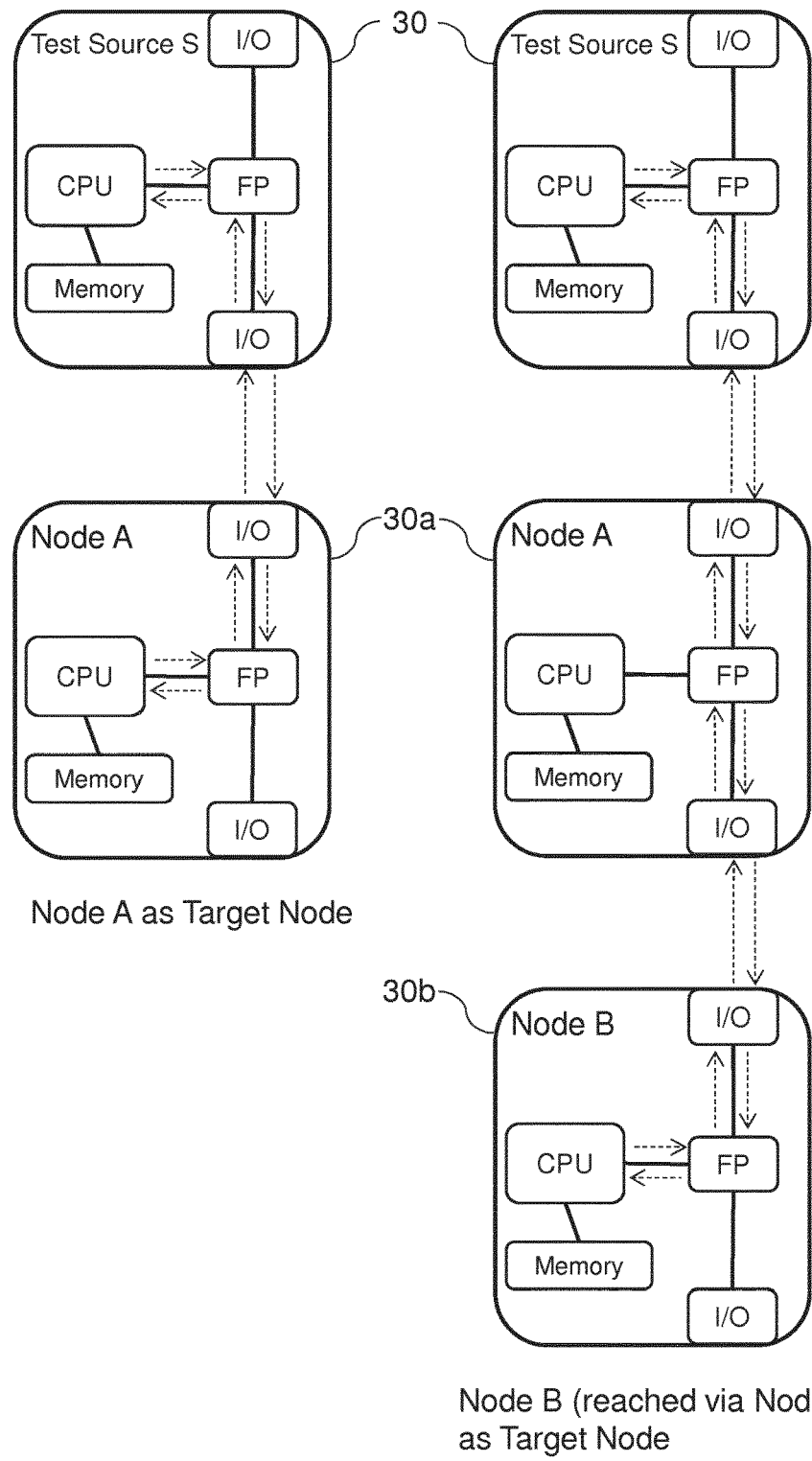
Figure 3 - "Fast-Path" and "Slow-Path" Processing at Different Nodes

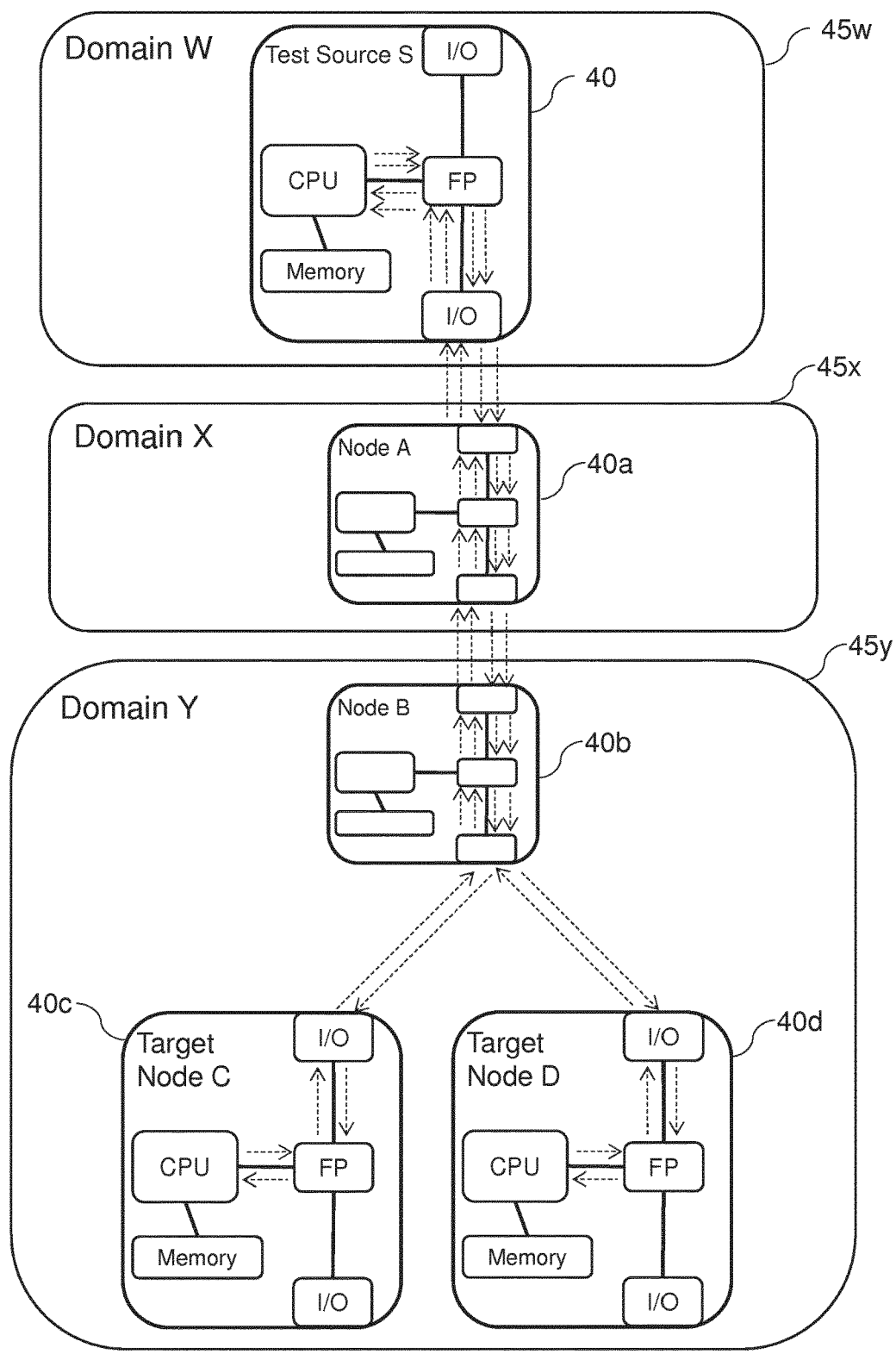
Figure 4 - Testing Different Nodes in a Domain

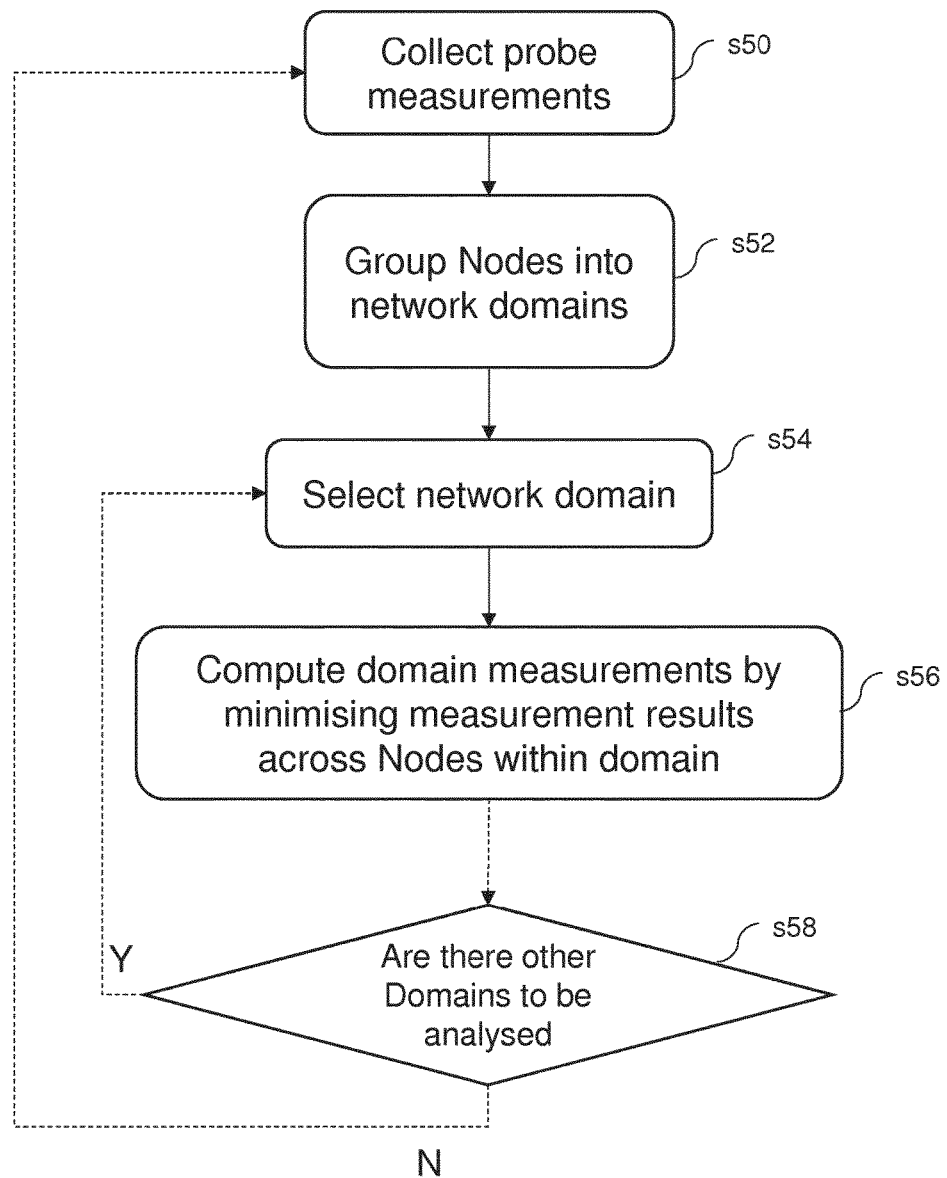
Figure 5 - Grouping Nodes into domains to minimise effect of individual Nodes

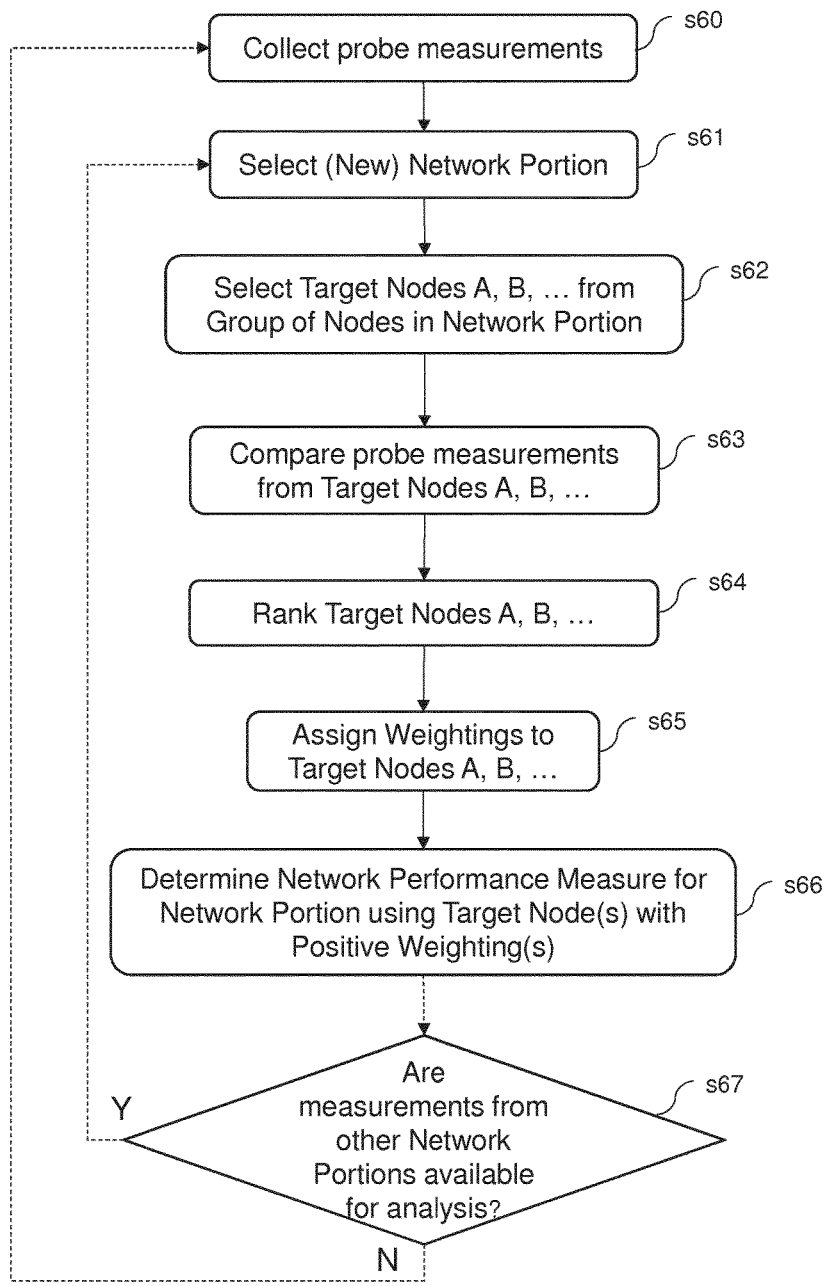
Figure 6 - Comparing Different Nodes in Same Group to identify More Reliable Node

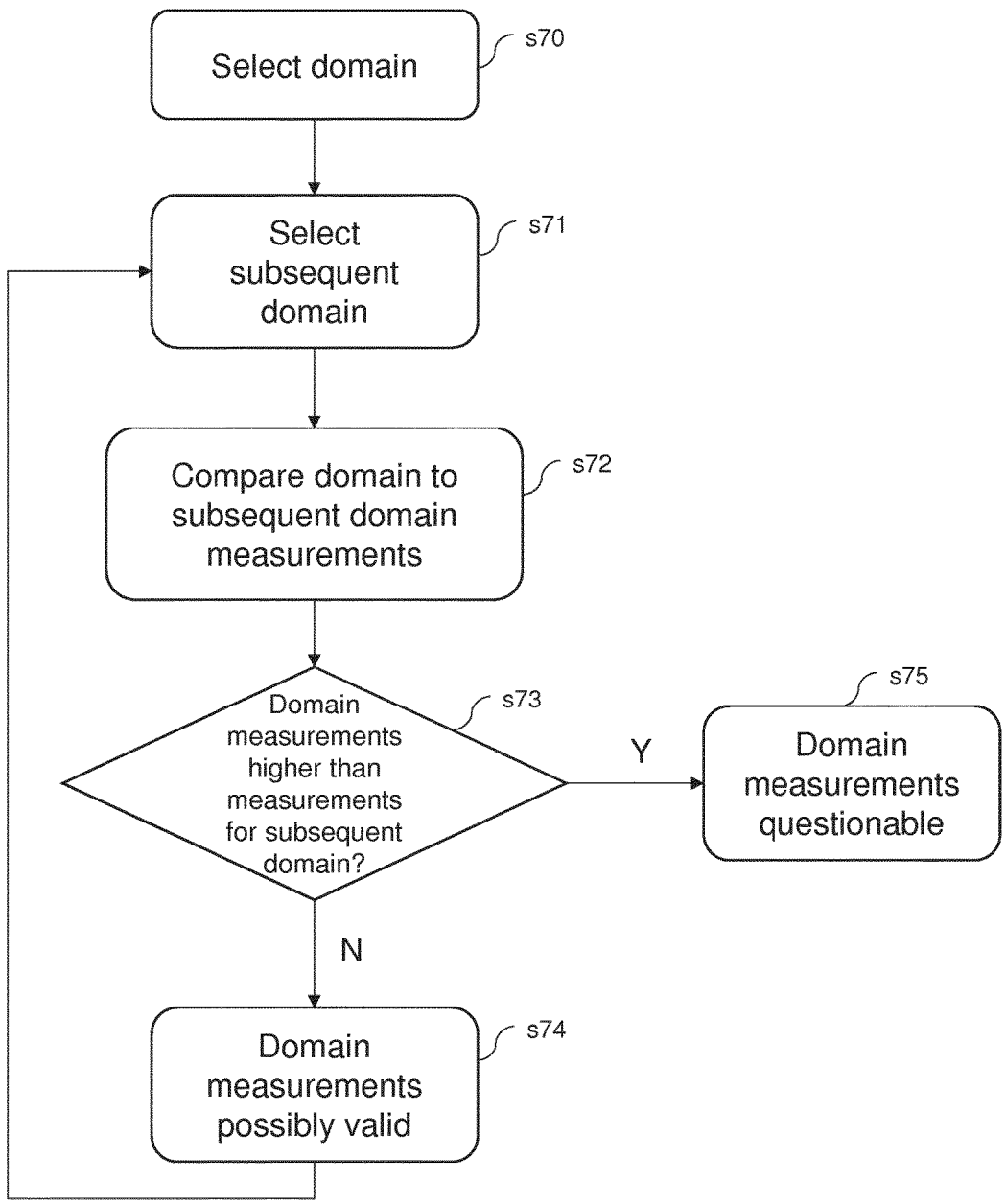
Figure 7 - Comparing domains to subsequent domains to identify questionable domain data

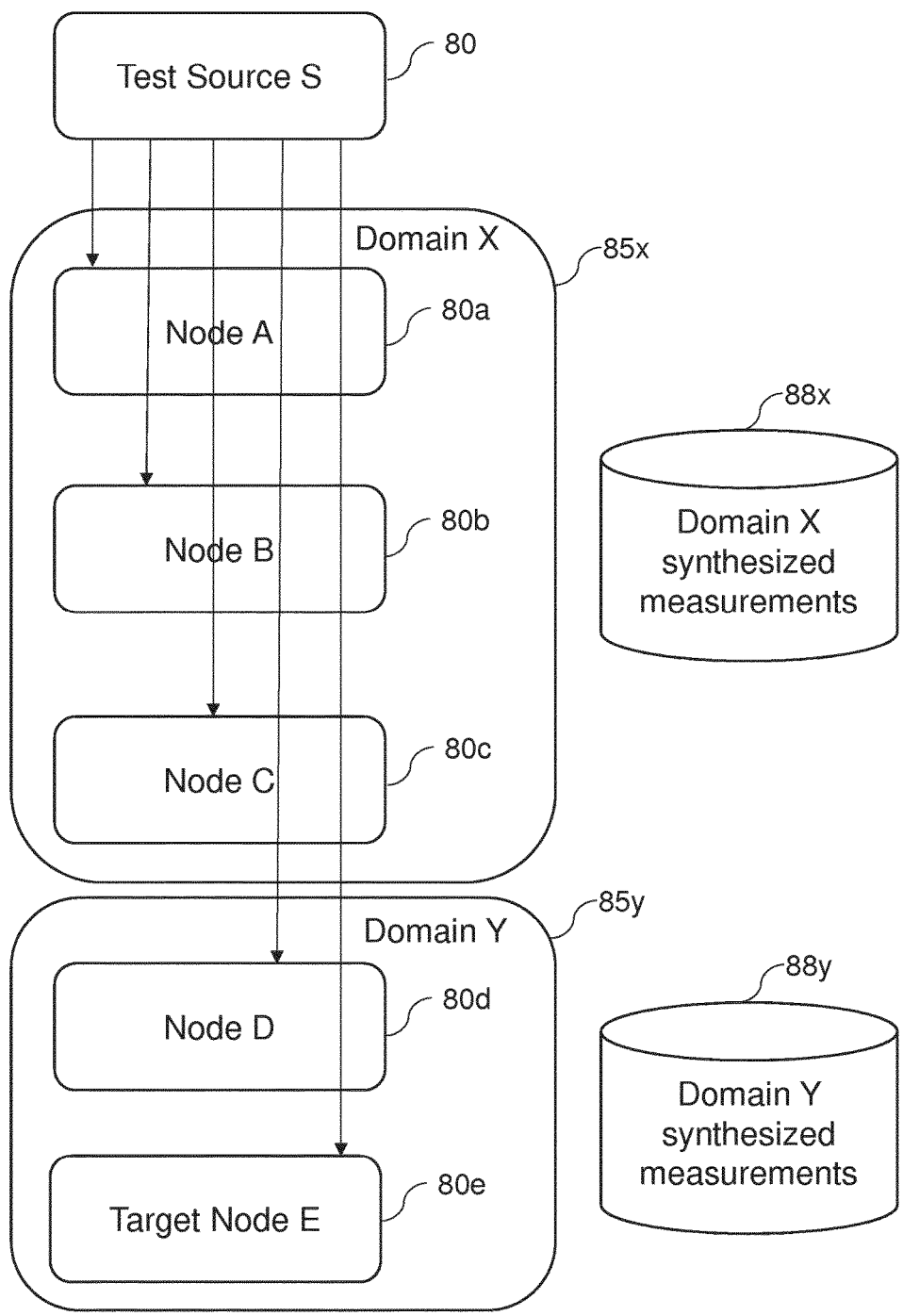
Figure 8 - Nodes grouped into network domains to produce synthesized domain measurement results

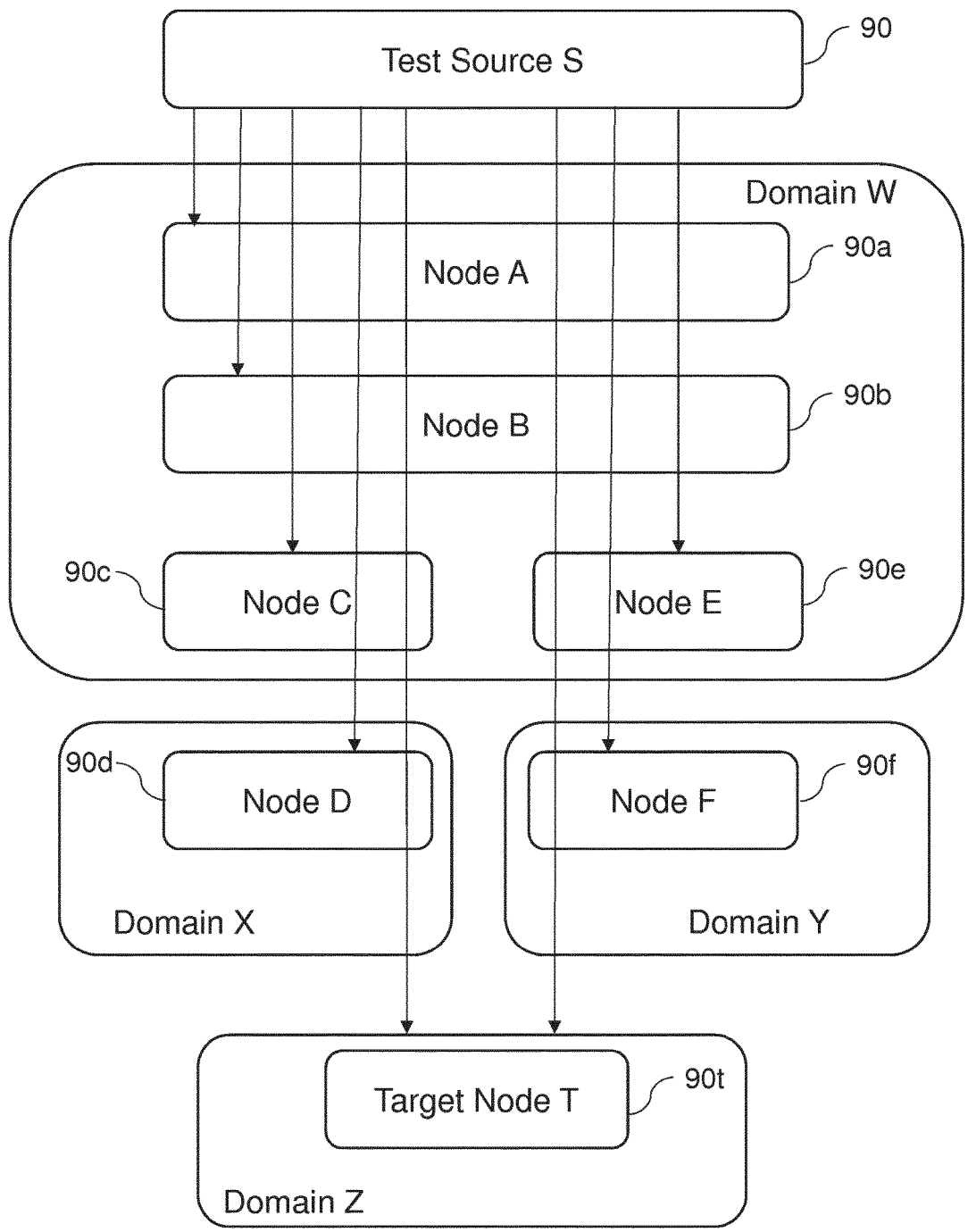
Figure 9 - Domain division preserving multiple routes

ANALYSIS OF NETWORK PERFORMANCE

This application is the U.S. national phase of International Application No. PCT/EP2016/072881 filed 26 Sep. 2016, which designated the U.S. and claims priority to EP Patent Application No. 15187797.4 filed 30 Sep. 2015, the entire contents of each of which are hereby incorporated by reference.

TECHNICAL FIELD

The present invention relates to data networks, and to methods and apparatus for analysing performance in respect of data networks. In particular, embodiments thereof relate to ways of analysing or testing network performance in respect of digital data networks such as the Internet, a corporate network, a data centre or a local network using data items such as data packets or other such messages.

BACKGROUND TO THE INVENTION AND PRIOR ART

Analysing networks in order to obtain measurements indicative of network performance can be done using various techniques, including techniques involving active testing (in which traffic is sent over a network specifically for the purpose of conducting tests) and techniques involving passive testing (in which traffic already flowing across a network due to user activity is analysed).

Techniques involving passive testing can show performance of real applications as used by real users, but are generally limited to testing applications and networks being used at a particular time, and can make it hard to compare network performance since the traffic over which tests are being applied varies. Active testing using reference traffic sent across the network does not generally have this disadvantage.

Techniques involving active testing also have problems in what can be tested, however. Typically, active testing techniques either test services themselves (e.g. web page or video performance), or the underlying network. Testing is generally performed from a test-point to a service or to a test-server located in the network. By using multiple test-servers, network operators can get a view of performance across different paths or sub-paths of the network, but it is expensive to deploy and maintain test-servers on a large scale, and this may not give views of networks not under the operator's control unless test-servers are sited within them. There is therefore an interest in using basic network routing equipment to conduct tests, using basic tools such as "traceroute" and "ping".

"Traceroute" is a technique which exploits the feature of Internet Protocol (IP) networks to generate a reply message to the sender of a message when a Time-To-Live (TTL) or hop-limit count expires.

"Ping" is a technique which can be used to test the reachability of nodes in a network, and to measure the round-trip time (RTT) for messages sent from an originating node (such as a computer, server, router, etc.) to a destination node and back. Messages in accordance with the Internet Control Message Protocol (ICMP), referred to as "ICMP probes", "probe messages", or simply "probes", may be sent from a sender acting as a testing-point, generally via one or more intermediate nodes, to a remote network node which, if it is the intended destination of or "target" for the probe (generally indicated in header information included in the probe), sends an associated probe response message back to the sender, allowing the sender to confirm that the target has been reached and allowing the sender to measure the RTT (also known as latency).

In the present context and below, it will be noted that the word "probe" is generally used in the sense of an "investigation" or one or more "investigative messages", rather than a "sensor". The probes concerned may therefore be one or more packets, or one or more of another type of message sent via a network.

Techniques such as the above are commonly used to determine the nodes located along a network path and also to analyse latency or latency variation between pairs of nodes. Overall latency can determine how far away a node is, while the variation in latency, which may be caused by the filling of network queues, can be used as an indication of network congestion. Such techniques can provide a very fine-grained view of network performance at each node of every network path, allowing performance to be viewed by a network operator even in respect of nodes and paths across networks not under the operator's ownership or control.

A problem with such techniques is that results are not always reliable indicators of network performance. While actual network traffic passing through a node is generally handled in an optimised forwarding element of the node ("fast-path" processing), a "traceroute" response or "ping" will generally be handled by the node's general Central Processing Unit (CPU), and generally involves the generation of a new packet or other such message ("slow-path" processing). Traceroute and ping measurements thus often indicate delays and losses that are not actually experienced by forwarded user traffic.

As a result, previous attempts to determine network performance using basic router functions such as traceroute and ping have often been flawed due to the possibly slow or variable handling of these probes (i.e. probe packets or other messages) by standard network equipment such as routers and other nodes, leading to mis-diagnosis of network problems. Many systems have therefore used specialised testing infrastructure (e.g. dedicated test-servers), but as indicated above, these can generally only give overall end-to-end path performance between the test point and wherever these test-servers are located.

There is thus a need for improved ways of testing network performance which are applicable even when using basic probe techniques such as "traceroute" and "ping" in IP networks.

The "Center for Applied Internet Data Analysis" ("CAIDA") has developed a tool called "Scamper" for use in a project referred to as the "Archipelago" project. This is intended to allows bulk traceroute and ping measurements. They have published the following papers: "Challenges in Inferring Internet Interdomain Congestion" by M. Luckie, A. Dhamdhere, D. Clark, B. Huffaker, & K. Claffy, Internet Measurement Conference (IMC), November 2014, pages 15-22, which is available online at: https://www.caida.org/publications/papers/2014/challenges_inferring_interdomain_congestion/ and "Measurement and Analysis of Internet Interconnection and Congestion" by D. Clark, S. Bauer, K. Claffy, A. Dhamdhere, B. Huffaker, W. Lehr, & M. Luckie, Telecommunications Policy Research Conference (TPRC), September 2014, which is available online at: https://www.caida.org/publications/papers/2014/measurement_analysis_internet_interconnection/

These papers consider how data can be used to infer congestion, particularly between network domains, and discuss how to analyse the data to detect network problems.

Referring to other prior art citations, US2005122983 ("Gilmartin") relates to calculating a VLAN latency measure, and in particular to calculating a multi-point VLAN latency measure without needing to know all of the details of the connection topology of the VLAN.

US2014269303 ("Comcast/Toy") relates to managing congestion in a network. One method involves receiving delay information (representing link level delay, connection level delay, or class of service level delay) relating to one or more network points, comparing delay information to a threshold, and if the delay information exceeds the threshold, executing a congestion control process associated with the one or more network points.

EP1206085 ("Infonet") relates to methods and apparatus for automated service level agreements.

An IETF Network Working Group Internet Draft entitled "A Round-trip Delay Metric for IPPM" dated November 1998 and authored by G. Almes, S. Kalidindi and M. Zekauskas defines a metric for round-trip delay of packets across Internet paths.

A "Tech Notes" publication from Cisco Systems entitled "Understanding the Ping and Traceroute Commands" (http://www.cisco.com/image/gif/paws/12778/ping_traceroute.pdf) dated January 2010 illustrates the use of the ping and traceroute commands and, with the aid of some debug commands, captures a more detailed view of how these commands work.

US2010/315958 ("Luo et al") relates to methods and apparatus for measuring network path quality in a non-cooperative manner, and involves sending a probe consisting of probe data packets to a remote node and receiving a response consisting of at least one response data packet therefrom.

SUMMARY OF THE INVENTION

The CAIDA papers discussed above discuss how to analyse data to detect network problems, but do not consider problems associated with specific nodes themselves having poor or variable response to network probes, let alone methods to deal with such problems.

Embodiments of the invention are based on the realisation that measurements made from sending a probe message such as a "Ping" message from a "testing" network node to a "target" network node, which are supposed to be indicative (at least primarily) of the performance of the network in respect of the path between the respective nodes, may also be influenced unduly by the time taken by the target node itself to perform local, on-board, "slow-path" processing of the probe message. Such "slow-path" processing generally only occurs in respect of probe messages where a node is the "target" node—if the same node is merely an intermediate node forwarding a probe message to a subsequent node which is the target node, it will generally only perform "fast-path" processing in respect of that probe message (i.e. to inspect its header and forward it). The present inventors have realised that this provides an opportunity to isolate and estimate the effect of a particular node's "slow-path" processing, and if it is estimated to be having a particularly damaging effect on the reliability of measurements where it is the target node, network performance analysis can be based (at least primarily) on other nodes whose own effect on probe measurements is less damaging.

According to a first aspect of the invention, there is provided a method of analysing network performance in relation to one or more portions of a network, each network portion comprising a group of nodes, the method comprising:

obtaining, in relation to a network portion to be analysed, probe measurements in respect of a plurality of target nodes in the group of nodes in said network portion, respective probe measurements in respect of the respective target nodes in the group each resulting from one or more probe test-messages being sent via a network path from a testing node to the respective target node and one or more associated probe response-messages triggered by receipt and local processing at the respective target node of the one or more probe test-messages being received via a network path from the respective target node by the testing node, the respective probe measurements each relating to one or more network performance characteristics in respect of the network paths taken by the respective probe test-messages and the probe response-messages associated therewith and being dependent also on the local processing of the respective probe test-messages at the respective target nodes;

comparing probe measurements obtained in respect of different target nodes in the group of nodes in said network portion, and in dependence on the comparison, assigning a weighting in respect of at least one of said target nodes; and determining a network performance analysis measure in relation to said network portion according to a predetermined function dependent on at least one probe measurement in respect of at least one of said target nodes in the group of nodes in said network portion and on the weighting determined in respect of said at least one target node.

Preferred embodiments may be used to identify whether one or more particular target nodes from the group in a particular network portion (e.g. a network domain) is/are likely to be providing unreliable results by comparing results obtained by sending similar probes to different target nodes in the same network portion. If the results in respect of one or more nodes in the network portion indicate a lower round-trip time than those in respect of others, for example, this is a strong indication that the results indicating a higher round-trip time are being unduly influenced either by internal processing within the node(s) in question or by issues within the network portion itself, and are thus unreliable indications as to performance on or of the network path(s) between the testing node and the network portion in question, so should be discounted or given lower weight when analysing network performance.

The group of nodes may correspond to: a set of all the nodes in a particular network domain or set of domains; all the nodes that are connected to the rest of the internet/network via the same node or nodes; a dependent group of nodes in an autonomous system; all the nodes in a home network; all the nodes in a corporate network; all the nodes in a data centre; or another type of group of nodes.

The predetermined function may be chosen such that the overall performance analysis measure may be based on or most strongly based on the probe measurement(s) obtained in respect of the target node in the group from which the "best" measurement(s) was (were) obtained, or on one or more probe measurements subsequently obtained in respect of that node. It will be understood that the meaning of the term "best" will depend on the type of measurement being made, but in general, in relation to some types of measurements such as "time" or "variability" measurements, the lowest will be deemed the best, whereas in relation to others, e.g. reliability or data volume measurements, the highest will be deemed the best.

The "return" network path taken by a probe response-message of a particular probe attempt will usually be the reverse of the "outward" network path taken by the associated probe test-message, but this will not necessarily be the case, and may not be a factor under the control of entities in control of the testing node or the target node in question.

According to preferred embodiments, respective weightings may assigned in respect of a plurality of said target nodes such that said network performance analysis measure is dependent on probe measurements obtained in respect of one or more of said respective target nodes, e.g. the or each target node to which a positive weighting has been assigned. Correspondingly, respective weightings may be assigned in respect of a plurality of said target nodes such that said network performance analysis measure is independent of probe measurements obtained in respect of one or more of said respective target nodes, e.g. any target node to which a zero weighting has been assigned.

The weightings may be "1" (i.e. full, or 100%) and "0" (i.e. zero, or 0%), in order either to include or exclude measurements in respect of particular target nodes in the overall analysis measure, or may be on a scale from 1 to 0 in order to allow the overall analysis measure to be influenced to a greater/lesser extent by measurements made in respect of target nodes deemed to be providing more/less reliable individual measurements.

According to preferred embodiments, the predetermined function may be such that the network performance analysis measure is dependent on one or more probe measurements obtained in respect of each of a plurality of said respective target nodes, e.g. the or each target node to which a positive weighting has been assigned. Correspondingly, the predetermined function is such that the network performance analysis measure is independent of one or more probe measurements obtained in respect of each of a plurality of said respective target nodes, e.g. any target node to which a zero weighting has been assigned.

According to preferred embodiments, probe measurements may be obtained and compared in respect of a plurality of target nodes in the group of nodes in said network portion whereby to determine weightings in respect thereof.

According to preferred embodiments, subsequent probe measurements may be obtained in respect of a subset of one or more target nodes selected from the group of nodes in said network portion, the subset comprising one or more target nodes selected in dependence on the comparison.

According to preferred embodiments, one or more of said probe measurements may result from a plurality of probe test-messages being sent via a network path from a testing node to the same target node at different times.

According to preferred embodiments, the step of obtaining said probe measurements in respect of the plurality of target nodes in the group of nodes in the network portion may comprise obtaining a plurality of probe measurements in respect of the same target node, and the step of comparing probe measurements obtained in respect of different target nodes in the group of nodes in the network portion may involve comparing said plurality of probe measurements in respect of the same target node with one of probe measurements obtained in respect of one or more other target nodes in the group of nodes in the network portion. The plurality of probe measurements in respect of the same target node may result from probe test-messages being sent to the same target node at different times.

According to preferred embodiments, the method may be performed in relation to a plurality of network portions, and comprise a comparison of probe measurements obtained in respect of target nodes in each of said network portions. Such a method may comprise:

obtaining, in respect of a target node in a first one of said network portions, a plurality of probe measurements, the probe measurements in respect the target node in the first network portion including:
  at least one probe measurement resulting from one or more probe test-messages being sent via a network path from a testing node to a target node in the first network portion and one or more associated probe response-messages triggered by receipt and local processing at said first target node of the one or more probe test-messages being received via a network path from the target node in the first network portion by the testing node; and
  at least one probe measurement resulting from one or more probe test-messages being sent via a network path from a testing node via the target node in the first network portion to a subsequent target node in a subsequent one of said network portions and one or more associated probe response-messages triggered by receipt and local processing at said subsequent target node of the one or more probe test-messages being received via a network path from the subsequent target node by the testing node;

comparing at least one of said one or more probe measurements resulting from one or more probe test-messages being sent to said target node in the first network portion with at least one of said one or more probe measurements resulting from one or more probe test-messages being sent via the target node in the first network portion to a subsequent target node in the subsequent network portion, and in dependence on the comparison, assigning a confidence rating in respect of the one or more probe measurements obtained in respect of the target node in at least one of the respective network portions.

Such a method may further comprise determining a network performance analysis measure according to a predetermined function dependent on at least one probe measurement in respect of the target node in at least one of said network portions and on the confidence rating assigned in respect of said at least one network portion.

According to preferred embodiments, the probe measurements obtained in respect of the respective target nodes may include measurements in respect of one or more of the following:
  one or more characteristics associated with response time (e.g. round-trip response time to a "ping" message);
  one or more characteristics associated with communication speed;
  one or more characteristics associated with communication delay and/or delay variation;
  one or more characteristics associated with communication volume;
  one or more characteristics associated with reliability;
  one or more characteristics associated with data loss;
  one or more characteristics associated with communications quality;
  one or more characteristics associated with security;
  one or more characteristics associated with service usage.
  or one or more other types of characteristic.

According to preferred embodiments, the group of nodes in the network portion to be analysed does not include the testing node, this preferably being located in a different network portion.

Methods according to any of the above may be used for analysing network performance in respect of network portions, each of said network portions being a network domain, for example.

According to a second aspect of the invention, there is provided apparatus configured to perform a method in accordance with the first aspect.

The apparatus may comprise one or more network nodes such as routers, or one or more processors associated with one or more such nodes, for example.

According to a third aspect of the invention, there is provided a computer program element comprising computer program code to, when loaded into a computer system and executed thereon, cause the computer to perform the steps of a method according to the first aspect.

The various options and preferred embodiments referred to above in relation to the first aspect are also applicable in relation to the second and third aspects.

Preferred embodiments of the invention are able to utilise existing tests based upon existing functionality found in IP routers. Traceroute and ping are available as client tools along with more comprehensive tools such as scamper that allow bulk automation of traceroute and ping tests. Traceroute exploits the feature of IP networks to generate a reply to the sender when a Time-To-Live (TTL) expires. Ping reflects special ICMP probes to a network node back to the sender in order to test the round-trip-time (also known as latency).

Preferred embodiments of the invention are able to use such tools to produce individual test results for routers along a path from the test point. Such test results may record the time at which the test was executed, the IP node being tested, and performance data such as whether a response was returned along with the delay (or round-trip time) taken to respond.

These individual results may then be used to perform an analysis of the performance in respect of each of a number of nodes. The performance considered is commonly the overall (average) latency to reach the node as well as variation in the latency which might indicate congestion. The techniques developed by CAIDA discussed above can be used to look for diurnal variation in the latency which would be expected from peak-time network usage, however such diurnal variations can also exist in a node's response to traceroute and ping even when the network is not congested.

BRIEF DESCRIPTION OF THE DRAWINGS

Preferred embodiments of the present invention will be described with reference to the appended drawings, in which:

FIG. 1 shows a network node and two neighbouring nodes;

FIG. 2 shows several network nodes on a path;

FIG. 3 illustrates "fast-path" and "slow-path" processing at different nodes;

FIG. 4 shows a network comprising nodes in different domains, and serves to illustrate how tests can be made using different nodes in the same domain in a method according to a preferred embodiment;

FIG. 5 is a flow-chart illustrating how nodes may be analysed on a domain-by-domain basis in order to minimise the effect of individual anomalous nodes in a domain;

FIG. 6 is a flow-chart illustrating a method according to a preferred embodiment;

FIG. 7 is a flow-chart illustrating a method according to a preferred embodiment in which probe measurements in respect of domains may be compared with probe measurements in respect of subsequent domains in order to identify questionable domain data;

FIG. 8 shows another network topology comprising nodes in different domains, and serves to illustrate how nodes grouped into network domains may be used to produce synthesized domain measurement results; and FIG. 9 shows a further network topology comprising nodes in different domains, and serves to illustrate domain division preserving multiple routes.

DESCRIPTION OF PREFERRED EMBODIMENTS OF THE INVENTION

With reference to the accompanying figures, methods and apparatus according to preferred embodiments will be described.

Before describing preferred embodiments of the invention, the issue of "slow-path" and "fast-path" processing in network nodes such as routers, referred to briefly above, will be explained in more detail with reference to FIGS. 1, 2 and 3.

Referring to FIG. 1, this shows a Network Node 10 and two Neighbouring Nodes 10' and 10", which are referred to respectively as being an "upstream" Node 10' and a "downstream" Node 10". Network Node 10 is shown expanded and in detail, with individual/internal functional modules shown (noting that these may be implemented as software or hardware modules, and noting that the separation between them may in fact be functional, rather than spatial), in order to assist with an explanation of the main functions thereof. The two neighbouring nodes 10' and 10" would generally have similar or corresponding individual/internal functional modules, but these are not shown in order to avoid unnecessarily complicating the figure.

It will be understood that the terms "upstream" and "downstream" are comparative, and depend on the role a particular node is playing in relation to a particular exchange of data—a first node can be upstream of a second node in relation to the path taken by one packet and downstream of the second node in relation to the path taken by another packet—but for the present discussion, these terms are used in relation to scenarios where:

(i) upstream node 10' is sending data (e.g. one or more probe messages, comprising one or more data packets) along a path via node 10 to "downstream" network node 10", in which case the function of node 10 is to receive data from upstream node 10' and forward it on to downstream node 10"; and (ii) upstream node 10' is sending data to node 10 itself and receiving a response therefrom.

In FIG. 1, the solid arrows (H1, h1, h2, H2) relate to scenario (i), and indicate the one-way path taken by data sent from upstream node 10' having downstream node 10" as its (intended) destination address (as indicated in its header or otherwise), that reaches and is forwarded by node 10 on its path from upstream node 10' to downstream node 10". Of these arrows, those with a capital "H" (i.e. H1 and H2) indicate external hops on the path, i.e. the hop H1 between nodes 10' and 10, and the hop H2 between nodes 10 and 10". Those with a lower-case "h" (i.e. h1 and h2) indicate internal processing paths within node 10 for data received from node 10' by a first input/output (I/O) interface 101 of node 10 and passed to the forwarding processor 103 of node 10 (h1), then passed from the forwarding processor 103 of node 10 (h2) to a second I/O interface 109 of node 10 which presents the data for forwarding from node 10 on to node 10".

As indicated above, data packets in an IP network generally indicate their destination IP address (as well as their source address and other information) in their IP header, which would generally be used in relation to a "ping" test. For a traceroute request, the header may (also) indicate the Time-To-Live (TTL) hop count, but in this scenario, the target IP address might not be the same as the traceroute destination/target.

The dotted arrows (h3, h4, h5 and H3, and ignoring h1/3 and h4/5 for the time being) relate to scenario (ii), and together with solid arrows H1 and H3 indicate the two-way path taken when data is sent from upstream node 10' having node 10 as its (intended) destination address, when that data reaches node 10 and is processed there, and when an associated response is sent by node 10 back to upstream node 10'. Again, arrows with a capital "H" (i.e. H1 and H3) indicate external hops on the path, i.e. the hop H1 between nodes 10' and 10 (also performed in scenario (i)), and the hop H3 back from node 10 to node 10'. Those arrows with a lower-case "h" (i.e. h1, h3, h4 and h5) indicate internal processing paths within node 10 for data received from node 10' by I/O interface 101 of node 10 and passed to the forwarding processor 103 of node 10 (h1, common to scenario (i)), which is found by node 10 to be targeted at node 10 itself, and which is therefore passed for processing by the CPU 105 of node 10 (h3), processed there, passed back to the forwarding processor 103 of node 10 (h4), passed from there back to I/O interface 101 of node 10 (h5) and presented for forwarding from node 10 back to node 10' (H3). The CPU 105 is shown as having an associated memory 107, in which it may store information such as routing tables, the IP addresses of the interfaces, etc.

Thus, in relation to scenario (i), if node 10 is serving as an intermediate node between an upstream node 10' and a downstream node 10", and is therefore required merely to forward data such as a probe message from node 10' on to node 10", the path taken by the data is:

H1→h1→h2→H2

In relation to scenario (ii), however, if node 10 is serving as the target or destination node for data such as a probe message sent to it from upstream node 10', and is therefore requested to send a probe response to the upstream node 10' (so is therefore required to process the probe message in its CPU 105 before sending a response message back to node 10', the path taken by the data is:

H1→h1→h3→h4→h5→H3

(NB In relation to the presently-described embodiment as described above, the I/O interfaces 101 and 109 of Node 10 serve simply as interfaces whose function is to forward data received from an external node (e.g. Node 10' or Node 10") to the forwarding processor 103, and to forward data received from the forwarding processor 103 to an external node (e.g. Node 10" or 10'). It is the forwarding processor 103 whose function it is to inspect received data and, in the case of most data packets, including messages such as "ping" requests, determine (e.g. from reading a "destination address" indication in a header of a packet or other such message) whether the node itself is the intended destination for the data (in which case the data is passed to the CPU 105) or whether another node is the intended destination for the data (in which case the data is passed to the appropriate I/O interface for forwarding). (For "traceroute" tests, the issue may be whether a packet's header indicates an expired TTL, rather than whether the packet has reached its intended destination, however.) In any case, it will be noted however that curved dotted arrows referred to as "h1/3" and "h4/5" are shown in FIG. 1. These illustrate the situation in relation to alternative embodiments, in which the function of inspecting received data and determining whether the node itself is the intended destination for the data or whether another node is the intended destination for the data may be performed by the I/O interface receiving the data. In such embodiments, data requiring processing by the CPU 105 may be passed to it internally from the I/O interface 101 along the internal processing path indicated by curved dotted arrow h1/3, without passing through forwarding processor 103, and response data may be passed internally from the CPU 105 back along the path indicated by curved dotted arrow h4/5 to the I/O interface 101, again without passing through forwarding processor 103. The issue of "fast-path" and "slow-path" processing discussed above and below is applicable in relation to both types of embodiment.)

An important issue to note in relation to the above is that when forwarding a probe (such as a "traceroute" or "ping" message), a normal node (as opposed to a dedicated test-server) typically handles this in the same fashion as it handles other packets (NB it is said to be processed on the "fast path", where the word 'path' here refers to an 'internal processing path within the node', rather than to a network path); the node is optimised for forwarding packets and the operation may be carried out entirely in hardware. However, when such a node responds to a probe (for instance, because the TTL of a traceroute packet has reached zero, or because the node is the target or intended destination of a "ping" packet), then the node is said to process the packet on the "slow path" (the word 'path' again referring to an 'internal processing path within the node'); the "response" operation involves the node's CPU, and generally includes generation of a new packet/message which is sent back towards the source of the probe.

As a result of this, measurements of a characteristic relating to performance along a network path (e.g. round-trip response time or delay, variation in round-trip response time or delay, etc.) desired to be measured using one or more probe messages can be distorted by the "slow-path" processing of the probe message(s) on the probe's "target node" itself due to its internal processing, and in particular due to the speed, congestion-state, reliability or another characteristic of the CPU of the target node itself. If the performance measurement desired is one indicative of the performance state of the path between the testing node and the target node, distortion to such measurements being unduly influenced by the "slow-path" processing of the target node itself being unduly slow is generally undesirable.

It can thus be desirable to identify nodes causing (or deemed likely to be causing) significant distortion to individual probe measurements by virtue of their own "slow-path" processing and/or to identify nodes causing (or deemed likely to be causing) the least or most distortion, and therefore allow overall network analysis to be based at least primarily on probe measurements from one or more nodes found (or deemed likely) to be causing the least distortion, and possibly to allow measurements likely to have been more distorted to be removed or ignored from the overall network analysis.

In the interest of simplifying the explanation of the above issues, FIG. 1 only illustrates situations involving the minimum numbers of nodes necessary, but it will be understood that paths across networks may involve several nodes and hops therebetween, and networks are generally branched, so other routes between nodes may also be possible.

Further, while Node 10 is shown as having two I/O interfaces, a first one (101) for receiving data from and sending data to Node 10', and second one (109) for receiving data from and sending data to Node 10", a node may just have one interface for all sending and receiving, one interface for sending and another for receiving, several interfaces, one for each of a number of neighbouring nodes, or another such arrangement of interfaces.

With reference to FIG. 2, for example, which shows several network nodes on a path, it will be understood that a path across a network may generally have several intermediate nodes between an original sender (e.g. Test Source S, 20) of a message such as a probe message and the target for that data. For example if Node E, 20*e*, is the target node for a probe message 22*e* from Test Source S, and data travelling from Test Source S to Node E, is received and forwarded respectively by Nodes A, B, C, and D (20*a*, 20*b*, 20*c*, 20*d*) before reaching Node E, each of Nodes A, B, C and D acts as an intermediate node in respect of the probe message 22*e* from Test Source S to Node E, and may also act as an intermediate node in respect of as associated response message 24*e* from Node E back to Test Source S (although it should be noted that this "return" path may not necessarily be the reverse of the "outward" path). In such a scenario, the messages would be subjected to "fast-path" processing by each of Nodes A, B, C and D, and to "slow-path" processing only by Node E.

It will also be understood that while Test Source S is shown as sending probe messages 22*a*, 22*b*, 22*c*, 22*d* and 22*e* to each of Nodes A, B, C, D and E (i.e. each acting as the Target Node in respect of the probe message sent thereto) and receiving associated response messages 24*a*, 24*b*, 24*c*, 24*d* and 24*e* therefrom, any of the nodes shown may act as a Test Source and send probe messages to and receive associated response messages from any of the other nodes, at the same time or at different times, which may travel along any path linking the nodes, in either direction. Whether a particular node is involved in a particular probe attempt as a Test Source, as an intermediate node, or as a Target Node will determine whether its role will generally involve sending, forwarding, or receiving and responding to a probe message, which in turn will generally determine whether the particular node will process the probe only via its "fast-path" processing route (in order to send or forward the probe message downstream to another node, or forward a response message back towards the Test Source in question) or (additionally) via its "slow-path" processing route (in order to process the probe message in its own CPU, create a response message, and present this for transmittal back upstream towards the Test Source in question).

FIG. 3 illustrates how "fast-path" and "slow-path" processing may be performed at different nodes depending on whether the nodes are serving as the Target Node in respect of a particular probe or merely as an Intermediate Node on a path between a Test Source and a Target Node. For simplicity, it simply illustrates two probe messages being sent from a Test Source S, 30, one of which is sent with Node A, 30*a* as its Target Node, and the other of which is sent with Node B, 30*b* as its Target Node, along a path on which Node A, 30*a* is an Intermediate Node. It will be understood that in different embodiments, the respective probe messages may be sent at the same time by Test Source S, 30, or at different times, that multiple messages may be sent to each Target Node, and that other nodes may also be involved as Test Sources, Intermediate Nodes and Target Nodes, at the same or at different times. This simple example will be used in order to explain how comparisons of different probe measurements made (using "ping", "traceroute", or other such probing techniques) may be made and used.

The individual functional modules of the nodes 30, 30*a* and 30*b* (i.e. the I/O Interfaces, the Forwarding Processors, the CPUs and their associated memories) are shown in abbreviated form where applicable, but as these have been explained earlier with reference to FIG. 1, they are not individually numbered in FIG. 3 so as not to over-complicate the figure. Dotted arrows have been used in FIG. 3 in order to show the paths concerned (i.e. the external hops between the nodes as well as the internal processing paths within the nodes) which are traversed in respect of the respective probes (i.e. the respective "outward" paths taken by the respective probe test-messages from the Test Source S to the respective Target Nodes, and the respective "return" paths taken by the respective probe response-messages from the respective Target Nodes back to the Test Source S), but again, these are not labelled as it is thought that this would make the figure unnecessarily complex.

With preferred embodiments of the invention, performance measurements obtained from different probe messages being sent on different paths and/or between different Test Sources and/or Target Nodes are compared in such a way as to indicate which measurements have been, or are likely to have been, unduly influenced by unduly slow, unreliable, misleading or otherwise poor "slow-path" processing in the node acting as the Target Node for the probe message in question. The results of such comparisons can be indicative of which node or nodes is/are responding in such a way as to provide genuine or realistic indications of performance on the network path in question.

Referring to the left-hand side of FIG. 3, consider that a probe from Test Source S to Node A involves the following elements being traversed in the course of allowing a single probe measurement to be made:

(i) the "outward" network path from the originating test-point, Test Source S, to Node A (which itself comprises the dotted arrows within Test Source S from its CPU and on to its I/O interface to Node A, and the dotted arrow from the I/O interface of Test Source S to the I/O interface of Node A, but this sub-division is not of importance because the parts are common to the left-hand side and the right-hand side of the figure);

(ii) the ingress interface on Node A from Test Source S;

(iii) the response processing in respect of the probe within Node A (which itself is represented by the dotted arrows within Node A from its I/O interface via its Forwarding Processor to its CPU, and back via its Forwarding Processor to its I/O interface);

(iv) the egress interface on Node A back towards Test Source S; and (v) the "return" network path to the Test Source S.

Simplifying the terminology, we can say the following:

Overall Node $A$ measurement=Return path from $S$ to $A$+Probe response of $A$ where the contribution referred to as "Return path from S to A" to the overall Node A measurement includes the following four sub-contributions:

(i) a sub-contribution relating to the "outward" network path from the Test Source S to Node A;

(ii) a sub-contribution relating to the ingress interface on Node A;

(iv) a sub-contribution relating to the egress interface on Node A back towards Test Source S; and (v) a sub-contribution relating to the "return" network path from Node A to Test Source S.

It will be noted that the only part of the overall measurement not also forming part of the "Return path from S to A" contribution is that relating to (iii) above, i.e. the response processing in respect of the probe within Node A itself.

Now, with reference to the right-hand side of FIG. 3, consider a probe from the same Test Source S to subsequent Node B, 30b, sent via Node A, 30a. This measures the same elements as the probe to Node A except for the "slow-path" response processing in respect of the probe within Node A itself (as the probe to Node B is merely forwarded across Node A, via its "fast path" processing, rather than processed by the CPU of Node A via its "slow path" processing, but in addition, it now also includes the network path between Node A and Node B ("outward" and "return" contributions, as represented by the dotted arrows between Node A and Node B) and the probe response of Node B itself (represented by the dotted arrows within Node B from its I/O interface via its Forwarding Processor to its CPU, and back via its Forwarding Processor to its I/O interface).

Using the same convention as above, the contributions of overall measurements can be regarded as follows:

Overall Node B measurement=Return path from S to B+Probe response of B

Overall Node B measurement=Return path from S to A+Return path between A and B+Probe response of B Overall Node B measurement=Overall Node A measurement−Probe response of Node A return path between Node A and Node B+Probe response of Node B and Overall Node B measurement−Overall Node A measurement=Return path between Node A and Node B+Probe response of Node B−Probe response of Node A It can be seen from the above that the performance (which may be measured in terms of speed, throughput, reliability, consistency or any of a variety of other types of characteristic) seen when Node B is the Target Node will not always be slower, longer, smaller, larger, or otherwise worse (depending on the type of performance characteristic in question) than that seen when Node A is the Target Node (e.g. if the Node A probe response is unduly slow). However, any network performance of the path to Node A must be included in the performance seen at Node B. Thus, while it may not be possible to isolate clearly or completely the network performance to Node A, it is possible to identify node measurements that strongly appear to be compromised by the probe response time of Node A if, for example, a round-trip time measurement in respect of a probe from Test Source S to Node A has a greater RTT than a concurrent measurement in respect of a probe from the same Test Source S via Node A to subsequent Node B.

Grouping Nodes and Domain Analysis

Nodes in a network are generally grouped together into network domains or network portions (or other types of groupings). According to preferred embodiments, a technique based on the above concept can be used to allow different nodes in the same domain or portion (or other such group of nodes) to be tested in a corresponding manner (e.g. at the same time, using probes from the same Test Source), in order to obtain an overall performance measurement that is likely to be indicative of network performance in respect of the domain or portion (or other such group), and not influenced (unduly, at least) by questionable node measurements. This can make sense if there is interest in how the network performance varies between domains or portions, rather than by individual nodes. The reasoning for this is based on the idea that if results obtained from different Target Nodes in the same domain or portion (or other such group) differ significantly, it is indicative if significant differences between the Target Nodes themselves or respective the local paths to them within the domain or portion, rather than issues relating to the inter-domain or inter-portion path from the domain/portion in which the Test Source is located and the domain portion in which the Target Nodes are located.

The following explanation will be given in relation to a network such as that shown in FIG. 4, which shows a network comprising nodes in different domains, and serves to illustrate how tests can be made using different nodes in the same domain in a method according to a preferred embodiment. As with FIG. 3 above, it illustrates "fast-path" and "slow-path" processing are performed at different nodes depending on whether those nodes are serving as the Target Node in respect of a particular probe or merely as an Intermediate Node on a path between a Test Source and a Target Node. For simplicity, it illustrates two probe messages being sent from a Test Source S, 40 in Domain W, 45w. Of the probe messages, one is sent with Node C, 40c as its Target Node, and the other is sent with Node D, 40d as its Target Node. Nodes C and D are both in Domain Y, 45y, which is reached from Domain W along a path on which Node A, 40a and Node B, 40b are Intermediate Nodes. Node A is in Domain X, 45x. Node B, like Nodes C and D, is in Domain Y. It will be understood that in different embodiments, the respective probe messages may be sent at the same time by Test Source S, 40, or at different times, that multiple messages may be sent to each Target Node, and that other nodes may also be involved as Test Sources, Intermediate Nodes and Target Nodes, at the same or at different times. This simple example will be used in order to explain how comparisons of different probe measurements made (using "ping", "traceroute", or other such probing techniques) may be made and used.

The individual functional modules of the nodes 40, 40a, 40b, 40c and 40d (i.e. the I/O Interfaces, the Forwarding Processors, the CPUs and their associated memories) are shown in abbreviated form where applicable, but as these have been explained earlier with reference to FIG. 1, they are not individually numbered in FIG. 4 so as not to over-complicate the figure.

Dotted arrows have been used in FIG. 4 in order to show the paths concerned (i.e. the external hops between the nodes and domains as well as the internal processing paths within the nodes themselves) which are traversed in respect of the respective probes (i.e. the respective "outward" paths taken by the respective probe test-messages from the Test Source S to the respective Target Nodes C and D, and the respective "return" paths taken by the respective probe response-messages from the respective Target Nodes C and D back to the Test Source S), but again, these are not labelled as it is thought that this would make the figure unnecessarily complex.

With preferred embodiments, performance measurements made/obtained in respect of different nodes in the same domain (or other such group of nodes) when each is acting as the "Target Node" are compared.

Methods in accordance with a preferred embodiment will now be described with reference to FIGS. 5, 6, 7, 8, and 9.

FIG. 5 is a high-level flow-chart illustrating how nodes may be analysed on a domain-by-domain basis in order to minimise the effect of individual anomalous nodes in a domain. This shows probe measurements being collected (step s50) in respect of probes from the same Test Source (e.g. Test Source S) to at least two different Target Nodes in the same domain as each other (e.g. Nodes C and D, in Domain Y). At step s52, the various Target Nodes in respect of which measurements have been collected are grouped into domains, and at step s54, a domain is selected for analysis.

In this case, both Target Nodes are in Domain Y, so this is the domain is selected for analysis, but it will be understood that probe measurements in respect of other nodes in other domains may also be collected and analysed.

At step s56, domain measurements may computed by minimising measurement results across the nodes within domain, or a weighted sum may be used. If it is found at step s58 that there are other domains to be analysed, the process can return to step s50 and repeat in respect of those domains.

FIG. 6 is a flow-chart illustrating a method according to a preferred embodiment.

For this explanation, we will consider measurements of round-trip time (RTT) obtained by "ping" probes, but it will be understood that others characteristics may be measured using other probe techniques. We will consider an embodiment in which batches of probe measurements may be collected, which may include measurements relating to several possible domains, network portions or other such groups of nodes, but it will be understood that in other embodiments, the process may simply perform the analysis in relation to one group of nodes at a time.

In this embodiment, probe measurements are collected (step s60), one or more being in respect of each of at least two Target Nodes (such as Nodes C and D in FIG. 4) in the same network portion (such as Domain Y) being tested from the same Test Source (e.g. Node S) or by Test Sources in the same network portion (such as Domain W). If more than one measurement in respect of each node is available, the average, the total, the highest, the lowest, the variation or standard deviation, a quantile (e.g. the 95th percentile) of the results or some other appropriate function of those results available may be used, depending on the characteristic in question.

At step s61, a Network Portion is selected. Of the domains shown in the simple case of FIG. 4, this will be Domain Y, as that is the only domain shown as having more than one node, but in more complex cases, it may be another domain, network portion, or other such group.

At step s62, at least two Target Nodes from the group of nodes in the selected domain (or other such network portion) are selected. In the simple case of FIG. 4, these may be Nodes C and D, and the following description will be on this basis, but other nodes in the domain—such as Node B—may be selected as well as or instead of either of these.

The probe measurements from the selected Target Nodes (C and D) are then compared (step s63).

At step s64, the selected target nodes are ranked on the basis of the comparison of their measurements, and weightings are assigned to them on the basis thereof (step s65).

Steps s64 and s65 may simply involve selecting the "best" node (or nodes), or any meeting predetermined reliability criteria, and assigning a weighting of "1" to that (or those) while assigning a weighting of "0" to any others, in order to allow an overall Network Performance Measure to be determined based on measurements already or subsequently obtained with that node (or those nodes) as the Target Node. Alternatively, steps s64 and s65 may involve selecting the "worst" node (or nodes), or any failing to meet predetermined reliability criteria, and assigning a weighting of "0" to that (or those) while assigning a weighting of "1" to any others, in order to allow an overall Network Performance Measure to be determined that is not influenced by measurements already or subsequently obtained with that node (or those nodes) as the Target Node. In such alternatives, it will be understood that the meaning of the term "best" will depend on the type of measurement being made, but in general, in relation to some types of measurements such as "time" measurements and "variation" measurements, the lowest will generally be deemed the best, whereas in relation to others, e.g. reliability or data volume measurements, the highest will generally be deemed the best.

It will be noted that the weightings assigned may be "0", "1" or values between "0" and "1", depending on whether it is desired to determine overall Network Performance Measures on the basis of measurements from some nodes but not others, or on the basis of a weighted sum of measurements from all nodes having a positive weighting.

The process then continues to step s66, at which an overall Network Performance Measure can be determined based on measurements already or subsequently obtained with the "best" node or nodes as the Target Node, or with any node(s) having positive weighting(s).

If it is found at step s67 that measurements from other Network Portions are available for analysis, the process may then return to step s61 and be repeated in respect thereof. Alternatively, the process may then return to step s60 and be repeated in respect of new probe measurements.

Node measurements in respect of different nodes in a group can thus be compared. If a node has little or no probe response delay and/or probe failures then other nodes in the group should have similar or more delay and/or failures, for example. While one or more of other nodes may also have questionable data, comparing a particular node's measurement against a greater number of other nodes in a group that should be providing similar results will generally increase the potential to detect nodes with significant internal problems (e.g. "slow-path" response delays) and allow them to be ignored or weighted so as not to have a significant effect on overall network performance measures.

This approach can filter out node measurements that clearly have a degree of node probe delay and are therefore suspect for use in analysing the network path performance.

When considering whether a result is really higher than another result, the error or confidence of the value should preferably also be considered. For example it might be decided to discard a node's measurements if it is determined with a 90% confidence level (for example) that its delay exceeds that of other nodes in the group, even though the average of the measurement samples is actually higher.

Time Analysis

Simply comparing the average delay or probe failures between different Target Nodes in the same group and discarding higher measurements can still leave measurements that are still compromised by node probe response delays. For example, Node C may have very variable probe response delay. Averaged over time, its delay may appears to be lower than that at Node D. However, at a single point in time it might be possible to see that the delay on Node C actually far exceeds the delay at the same time on Node D. In this case, the measurements at Node C can therefore still be concluded to be questionable for network performance analysis, due to their unreliability or inconsistency.

In order to filter out more suspect node measurements, the measurements at each node can be divided into a temporal space. For example the measurements could simply be split into peak-time and off-peak network usage periods. If a node had a higher peak or off-peak measurement than other nodes in the group then it could be considered questionable. With enough results each node can be further sub-divided, for example into hours of the day (e.g. 8-9 pm), or simply within buckets along a continuous time axis (e.g. 8-9 pm, 20 Aug. 2015). It may be decided that for a node's measurements to be considered valid, it should be found (to a predetermined degree of confidence) that the delay and/or failure level in each division of the temporal space is higher at most or all other nodes in the group.

FIG. 7 is a flow-chart illustrating a method according to a preferred embodiment in which probe measurements in respect of domains may be compared with probe measurements in respect of subsequent domains in order to identify questionable domain data. This method can be thought of as a combination of the method explained with reference to FIGS. 4, 5 and 6 with the method explained earlier with reference to FIG. 3, but where the method explained with reference to FIG. 3 involved a comparison between a first Target Node and one or more subsequent Target Nodes reached via the first Target Node, in order to determine whether measurements made in respect of the first Target Node were unreliable, the method of FIG. 7 involves a similar comparison at the "Domain/Subsequent Domain" level. The method of FIG. 7 may be applicable in relation to network topologies such as those shown in FIGS. 8 and 9. The method of FIG. 7 will be discussed further below.

FIG. 8 shows a network comprising nodes in different domains, and serves to illustrate how tests can be made using different nodes in different domains in order to produce synthesized domain measurement results. It shows probe messages being sent from a Test Source S, 80 to Node A, 80a, Node B, 80b and Node C, 80c, all in Domain X, 85x, and also to Node D, 80d and Node E, 80e, both in Domain Y, 85y, where the network topology is such that the nodes in Domain Y are reached from the Test Source S along a path on which the nodes of Domain X are Intermediate Nodes. Also shown are databases 88x and 88y, which respectively store synthesized measurements for Domains X and Y, which will be discussed later.

With such network topologies, methods according to preferred embodiments, which can be thought of as involving a combination of the method explained with reference to FIGS. 4, 5 and 6 with that explained earlier with reference to FIG. 3, allow nodes within a domain to be combined to give a best-case or "synthesized measurement" for that domain. The term "synthesized measurements" refers to idea of using a combination of multiple individual Nodes into a single domain/group dataset as if it were a virtual Node, the measurements therefrom being "synthesized" to represent a measurement in respect of a domain/group that has not in itself been directly measured.

Domain-level results can then be compared against one or more subsequent domains to see if the domain result is still questionable even after combining multiple nodes therein.

FIG. 9 shows a network in which probe messages are being sent from a Test Source S, 90 to Node A, 90a, Node B, 90b, Node C, 90c and Node E, 90e all in Domain W. Probes may also pass via Node C to Node D, 90d, in Domain X, and probes may pass via this to a Target Node T, 90t, in Domain Z. Similarly, probes may also pass via Node E to Node F, 90f, in Domain Y, and probes may also pass via this to Target Node T. This illustrates the idea that there may be multiple routes via multiple domains to the same Target Node, allowing various types of comparison to be made according to embodiments of the invention. The purpose of this is to analyse the effect of different peering links between domains/groups. The use of Domain X and Domain Y allows a comparison to be made of each one separately to Domain W.

Turning back to the method of FIG. 7, a "First Domain" is selected (step s70). A "Subsequent Domain" is then selected (step s71), this being a domain that data such as probe messages reach via nodes in the First Domain. The respective domains could be Domains X and Y in FIG. 8, for example. Measurements indicative of the performance in respect of each of the domains are then obtained, using a method in accordance with that of FIG. 6 for each domain, for example, and the measurement for the first domain (e.g. Domain X) is compared (step s72) with the measurement for the subsequent domain (e.g. Domain Y). If it is found (at step s73) that the domain measurement for the "nearer" domain (e.g. Domain X) gives a lower (or less variable) RTT measurement (for example) than that for the "subsequent" domain (e.g. Domain Y), it can be concluded (at step s74) that the Domain X measurement is at least possibly valid (i.e. there is no clear suggestion that it is questionable), and it may be assigned a positive weighting or otherwise treated as possibly reliable during overall network performance analysis. If, on the other hand, it is found (at step s73) that the domain measurement for the "nearer" domain (Domain X) gives a higher (or more variable) RTT measurement (for example) than that for the "subsequent" domain (Domain Y), it can be concluded (at step s75) that the Domain X measurement is questionable (i.e. likely to have been overly influenced by processing issues within Domain X). While this gives no specific suggestion that Domain Y measurements are valid, it indicates that they are less questionable than those in respect of Domain X.

Measurements for two or more nodes within a single network portion, domain or other such group of nodes can thus be combined or otherwise analysed and processed to produce a "best case" delay or failure rate, for example, that is more likely to reflect network performance in respect of the group accurately, rather than be influenced by any individual node's processing in providing a response to the probe. The measurements for each node can be divided into a temporal space as previously. The minimum delay or failure values can then be taken across the nodes within the domain (or other group) for the same point in the temporal space. This means that if any one of the nodes is not affected by degraded probe response, then the value produced will be indicative of the actual network performance within that domain (or other group). This technique can work if nodes are intermittently affected by slow probe responses since there is generally a low chance that all nodes will be similarly affected at the same time.

Note that the domains or other such groups used for analysis can be any grouping of nodes and do not have to be constrained to entire Autonomous Systems within the Internet or could also span multiple Autonomous Systems. A domain could include just a single node. For example, if there are multiple links between two network operators, such as those operating the Test Source S and the Domain Z in FIG. 9, for example, then one or both of the operators' networks might be sub-divided into multiple analysis domains in order to capture the performance between the two operators on each of the peering links. In this case, where a node is shared between two domains, then the measurements would be divided between the two domains according to the path the probes followed.

Insofar as embodiments of the invention described are implementable at least in part using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of analysing network performance in relation to one or more portions of a network, each network portion comprising a group of nodes, the method comprising:
   obtaining, in relation to a network portion to be analysed, probe measurements in respect of a plurality of target nodes in the group of nodes in said network portion, respective probe measurements in respect of the respective target nodes in the group each resulting from one or more probe test-messages being sent via a network path from a testing node to the respective target node and one or more associated probe response-messages triggered by receipt and local processing at the respective target node of the one or more probe test-messages being received via a network path from the respective target node by the testing node, the respective probe measurements each relating to one or more network performance characteristics in respect of the network paths taken by the respective probe test-messages and the probe response-messages associated therewith and being dependent also on the local processing of the respective probe test-messages at the respective target nodes;
   comparing probe measurements obtained in respect of different target nodes in the group of nodes in said network portion, and in dependence on the comparison, assigning a weighting in respect of at least one of said target nodes; and
   determining a network performance analysis measure in relation to said network portion according to a predetermined function dependent on at least one probe measurement in respect of at least one of said target nodes in the group of nodes in said network portion and on the weighting determined in respect of said at least one target node.

2. A method according to claim 1 wherein respective weightings are assigned in respect of a plurality of said target nodes such that said network performance analysis measure is dependent on probe measurements obtained in respect of one or more of said respective target nodes.

3. A method according to claim 1 wherein respective weightings are assigned in respect of a plurality of said target nodes such that said network performance analysis measure is independent of probe measurements obtained in respect of one or more of said respective target nodes.

4. A method according to claim 1 wherein the predetermined function is such that the network performance analysis measure is dependent on one or more probe measurements obtained in respect of each of a plurality of said respective target nodes.

5. A method according to claim 1 wherein the predetermined function is such that the network performance analysis measure is independent of one or more probe measurements obtained in respect of each of a plurality of said respective target nodes.

6. A method according to claim 1 wherein probe measurements are obtained and compared in respect of a plurality of target nodes in the group of nodes in said network portion whereby to determine weightings in respect thereof.

7. A method according to claim 1 wherein subsequent probe measurements are obtained in respect of a subset of one or more target nodes selected from the group of nodes in said network portion, the subset comprising one or more target nodes selected in dependence on the comparison.

8. A method according to claim 1 wherein one or more of said probe measurements result from a plurality of probe test-messages being sent via a network path from a testing node to the same target node at different times.

9. A method according to claim 1 wherein the step of obtaining said probe measurements in respect of the plurality of target nodes in the group of nodes in the network portion comprises obtaining a plurality of probe measurements in respect of the same target node, and wherein the step of comparing probe measurements obtained in respect of different target nodes in the group of nodes in the network portion involves comparing said plurality of probe measurements in respect of the same target node with one of probe measurements obtained in respect of one or more other target nodes in the group of nodes in the network portion.

10. A method according to claim 9 wherein the plurality of probe measurements in respect of the same target node result from probe test-messages being sent to the same target node at different times.

11. A method according to claim 1, the method being performed in relation to a plurality of network portions, and comprising a comparison of probe measurements obtained in respect of target nodes in each of said network portions.

12. A method according to claim 11, the method comprising:

obtaining, in respect of a target node in a first one of said network portions, a plurality of probe measurements, the probe measurements in respect the target node in the first network portion including:
- at least one probe measurement resulting from one or more probe test-messages being sent via a network path from a testing node to a target node in the first network portion and one or more associated probe response-messages triggered by receipt and local processing at said first target node of the one or more probe test-messages being received via a network path from the target node in the first network portion by the testing node; and
- at least one probe measurement resulting from one or more probe test-messages being sent via a network path from a testing node via the target node in the first network portion to a subsequent target node in a subsequent one of said network portions and one or more associated probe response-messages triggered by receipt and local processing at said subsequent target node of the one or more probe test-messages being received via a network path from the subsequent target node by the testing node;

comparing at least one of said one or more probe measurements resulting from one or more probe test-messages being sent to said target node in the first network portion with at least one of said one or more probe measurements resulting from one or more probe test-messages being sent via the target node in the first network portion to a subsequent target node in the subsequent network portion, and in dependence on the comparison, assigning a confidence rating in respect of the one or more probe measurements obtained in respect of the target node in at least one of the respective network portions.

13. A method according to claim 12, the method further comprising determining a network performance analysis measure according to a predetermined function dependent on at least one probe measurement in respect of the target node in at least one of said network portions and on the confidence rating assigned in respect of said at least one network portion.

14. A method according to claim 1 wherein the probe measurements obtained in respect of the respective target nodes include measurements in respect of one or more of the following:
- one or more characteristics associated with response time
- one or more characteristics associated with communication speed;
- one or more characteristics associated with communication delay and/or delay variation;
- one or more characteristics associated with communication volume;
- one or more characteristics associated with reliability;
- one or more characteristics associated with data loss;
- one or more characteristics associated with communications quality;
- one or more characteristics associated with security;
- one or more characteristics associated with service usage.

15. A method of analysing network performance according to claim 1, each of said network portions being a network domain.

16. Apparatus comprising:
- non-transitory computer-readable storage memory storing instructions;
- a computer processor for executing the instructions read from the non-transitory computer-readable storage memory so that apparatus is configured to perform a method of analysing network performance in relation to one or more portions of a network, each network portion comprising a group of nodes, the method comprising:
  - obtaining, in relation to a network portion to be analysed, probe measurements in respect of a plurality of target nodes in the group of nodes in said network portion, respective probe measurements in respect of the respective target nodes in the group each resulting from one or more probe test-messages being sent via a network path from a testing node to the respective target node and one or more associated probe response-messages triggered by receipt and local processing at the respective target node of the one or more probe test-messages being received via a network path from the respective target node by the testing node, the respective probe measurements each relating to one or more network performance characteristics in respect of the network paths taken by the respective probe test-messages and the probe response-messages associated therewith and being dependent also on the local processing of the respective probe test-messages at the respective target nodes;
  - comparing probe measurements obtained in respect of different target nodes in the group of nodes in said network portion, and in dependence on the comparison, assigning a weighting in respect of at least one of said target nodes; and
  - determining a network performance analysis measure in relation to said network portion according to a predetermined function dependent on at least one probe measurement in respect of at least one of said target nodes in the group of nodes in said network portion and on the weighting determined in respect of said at least one target node.

17. A non-transitory computer-readable storage medium storing a computer program element comprising computer program code to, when loaded into a computer system and executed thereon, cause the computer to perform the steps of a method of analysing network performance in relation to one or more portions of a network, each network portion comprising a group of nodes, the method comprising:
- obtaining, in relation to a network portion to be analysed, probe measurements in respect of a plurality of target nodes in the group of nodes in said network portion, respective probe measurements in respect of the respective target nodes in the group each resulting from one or more probe test-messages being sent via a network path from a testing node to the respective target node and one or more associated probe response-messages triggered by receipt and local processing at the respective target node of the one or more probe test-messages being received via a network path from the respective target node by the testing node, the respective probe measurements each relating to one or more network performance characteristics in respect of the network paths taken by the respective probe test-messages and the probe response-messages associated therewith and being dependent also on the local processing of the respective probe test-messages at the respective target nodes;
- comparing probe measurements obtained in respect of different target nodes in the group of nodes in said network portion, and in dependence on the comparison, assigning a weighting in respect of at least one of said target nodes; and determining a network performance analysis measure in relation to said network portion according to a predetermined function dependent on at least one probe measurement in respect of at least one of said target nodes in the group of nodes in said network portion and on the weighting determined in respect of said at least one target node.

* * * * *